United States Patent [19]

Nagumo et al.

[11] 4,229,395

[45] Oct. 21, 1980

[54] METHOD FOR INJECTION MOLDING THICK-WALLED ARTICLES

[75] Inventors: Tadashi Nagumo, Kamakura; Akio Yasuike, Yokohama; Hiroshi Kataoka, Tokyo, all of Japan

[73] Assignee: Asahi-Dow Limited, Tokyo, Japan

[21] Appl. No.: 918,694

[22] Filed: Jun. 23, 1978

Related U.S. Application Data

[63] Continuation-in-part of Ser. No. 776,886, Mar. 11, 1977, abandoned.

[30] Foreign Application Priority Data

Mar. 13, 1976 [JP] Japan .................................. 51-27447
May 17, 1978 [JP] Japan .................................. 53-57513

[51] Int. Cl.² ......................... B29D 27/00; B29F 1/06
[52] U.S. Cl. ..................................... 264/51; 264/45.5; 264/328.13; 264/DIG. 83; 425/166; 425/552; 425/588; 425/450.1; 425/451
[58] Field of Search ...... 264/45.5, DIG. 14, DIG. 83, 264/328; 425/451, 145, 166, 552, 588, 450.1

[56] References Cited

U.S. PATENT DOCUMENTS

| | | | |
|---|---|---|---|
| 3,268,635 | 8/1966 | Kraus et al. ............................. | 264/41 |
| 3,642,403 | 2/1972 | Havlik ................................... | 425/145 |
| 3,694,529 | 9/1972 | Josephsen et al. ........... | 264/DIG. 83 |
| 3,830,613 | 8/1974 | Aoki .................................. | 425/451 X |
| 3,940,465 | 2/1976 | Hauser ................................. | 264/40.5 |
| 3,960,996 | 6/1976 | Balevski et al. ............. | 264/DIG. 83 |
| 3,988,403 | 10/1976 | Angell et al. ................ | 264/DIG. 83 |
| 4,096,218 | 6/1978 | Yasuike et al. .............. | 264/DIG. 83 |
| 4,140,672 | 2/1979 | Kataoka ............................. | 264/45.1 |

FOREIGN PATENT DOCUMENTS

2552846 6/1976 Fed. Rep. of Germany ... 264/DIG. 83

OTHER PUBLICATIONS

Weir, Clifford L. "New Foam Molding Process Offers New Product Versatility", in *Modern Plastics*, Mar. 1969, pp. 68–70, 72.
"Krauss-Maffei TSG Injection Machines", in *British Plastics*, Nov. 1970, pp. 129–132.
Meyer, Wolfgang "Do Advanced Structural Foam Molding Processes Reduce Part Cost?" in *Journal of Cellular Plastics* Jan./Feb., 1978, pp. 50–58.

*Primary Examiner*—Philip Anderson
*Attorney, Agent, or Firm*—Cushman, Darby & Cushman

[57] ABSTRACT

Molten synthetic resin material containing foaming agent in an amount of 0.05 to 5 percent by weight is injected into a pre-pressurized mold cavity in a mold which is closed by a relatively low clamping force having a coefficient in the range of 10 to 40, said coefficient being represented as a ratio of clamping force to maximum injection shot volume. The above injection step is carried out for at least 3 seconds. After the injection step has been initiated, the pre-pressurized mold is released to atmosphere during the injection step at the soonest. At least two molds may be used to be alternately charged with said material.

3 Claims, 14 Drawing Figures

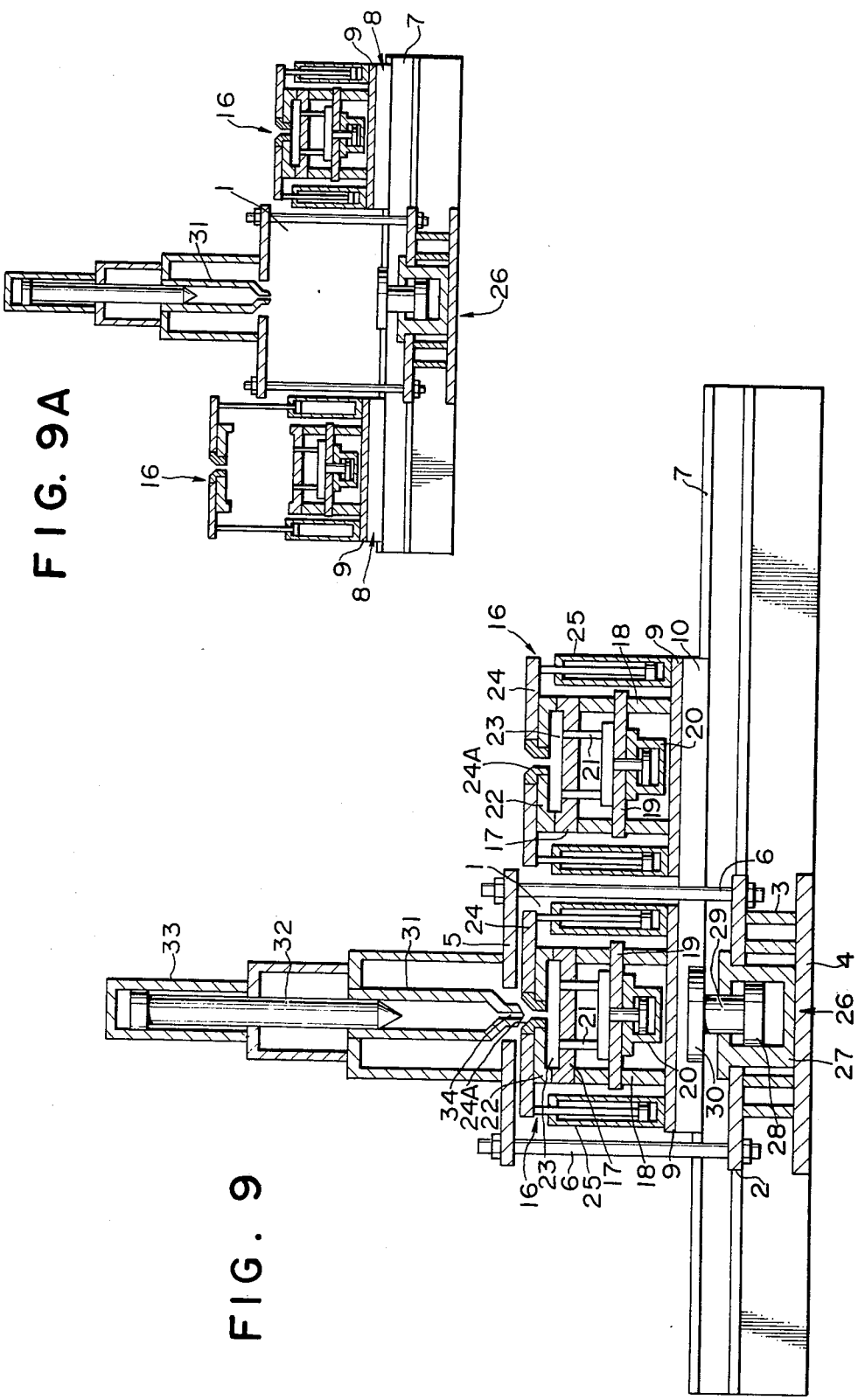

METHOD FOR INJECTION MOLDING THICK-WALLED ARTICLES

This is a continuation-in-part of our prior application Ser. No. 776,886 filed on Mar. 11, 1977 now abandoned.

The present invention relates to a method suitable for injection molding foamed thick-wall articles having an average wall thickness in the range of between 3.5 and 100 millimeter, preferably between 4 and 20 millimeter.

Not being limited to an injection molding, it is important that superior molded articles are produced in addition to more effectively manufacturing thereof for reducing costs in the articles. Particularly, excellent foamed thick-wall articles can be injection molded by inhibiting the action of foaming agent contained in a synthetic resin to be molded.

In the prior art, for inhibiting such action of foaming agent, there is known the fact that a mold cavity is pre-pressurized by any suitable gas such as air and thereafter charged with a molten synthetic resin containing a foaming agent. One of such techniques is disclosed in U.S. Pat. No. 3,268,635, for example. The pre-pressurization of mold cavity prevents the blowing gas from escaping out of the injected synthetic resin so that the utilization thereof will be increased, particularly in molded thick-wall articles. This also confines the resolved residue of the foaming agent within the material so that the mold can be prevented from corrosion.

However, the prior art techniques for pre-pressurizing the mold cavity prior to injection takes into no consideration of injection speed, that is, period of time required to inject a predetermined volume of synthetic resin into a mold cavity. Considering an injection molding machine and associated mold means on the whole, the injection speed is a significant factor for reducing the manufacturing cost thereof, this leading to decrease a unit cost in each product.

It is an object of the present invention to provide a novel method for injection molding more cheaply excellent foamed thick-wall articles by a combination of a pre-pressurization of mold cavity with an appropriately selected injection speed.

Another object of the present invention is to provide a novel method for injection molding foamed thickwall articles more effectively in the above combination.

The present invention will now be described in connection with the accompanying drawings in which:

FIG. 9 is a sectional view showing the injection molding system in a plane different from that of FIG. 8;

FIG. 9A is a sectional view similar to FIG. 9, showing another injection molding system for carrying out the method of the present invention;

Figure 1:
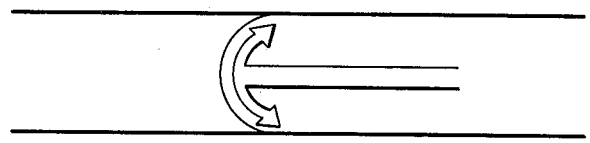
FIG. 1 is a schematic view illustrating a flow of synthetic resin which is injected into a mold cavity.
Figure 2:
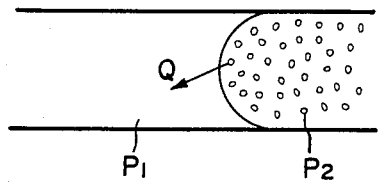
FIG. 2 is a schematic view similar to FIG. 1, illustrating a diffusion of blowing gas from the flow of synthetic resin within the mold cavity.

An injection molding process according to the present invention includes a step of pre-pressurizing a mold cavity by a gas under pressure prior to injection of a synthetic resin containing a foaming agent thereinto. Such a pre-pressurizing step will now be described as follows:

Referring to FIGS. 1 and 2, a molten synthetic resin material which has been injected into a mold cavity has maximum flow speed in the central portion of the mold cavity and minimum flow speed at the walls of the cavity which is substantially zero speed. As a result, the injected material moves mainly in the central portion of the mold cavity and then displaces toward the cavity walls at the advanced extremity of the flow as shown by an arrow in FIG. 1. If the material includes a foaming agent, a blowing gas tends to diffuse from the material at the advanced extremity thereof. This results in a decrease in the foaming action of the foaming agent.

A diffusion Q of the blowing gas can be represented by the following formula:

$$Q = DS \frac{(P_2 - P_1)}{L} t \cdot A$$

where
- $DS$ = Constant in diffusion;
- $L$ = Distance diffusion;
- $P_2$ = Pressure of blowing gas in the synthetic resin;
- $P_1$ = Pressure of gas within a mold cavity;
- $t$ = Time; and
- $A$ = Area.

It will be understood from the above formula that the lower value $(P_2 - P_1)$, $t$ or $A$ is effective to reduce the diffusion of blowing gas so as to increase the foaming efficiency. The pre-pressurization of the mold cavity prior to injection of the synthetic resin material will cause the value $P_1$ to increase so that the value $(P_2 - P_1)$ will decrease.

It is also effective that higher injection speed, that is, shorter period of time required to inject a predetermined volume of molten synthetic resin into the mold cavity (injection time t) is used. In order to increase the efficiency in an injection molding machine, hydraulic fluid can be supplied to an injection cylinder for driving an injecting piston located therein in larger rate of flow to increase the injection pressure thereof, in addition to use of runner(s) and gate(s) of shorter length and larger diameter. However, the increase of the hydraulic fluids to the injecting cylinder will correspondingly increase the manufacturing cost in the injection molding machine. The use of larger runner and gate will correspondingly provide limitations in manufacturing of mold assemblies and in shape of moldings.

"Foamed thick-wall article" in the present invention is a molded product having an average wall thickness in the range of between 3.5 millimeter and 100 millimeter, preferably between 4 millimeter and 20 millimeter. This means that increased shot volume and injection time are used to produce such a foamed thick-wall article and also the area from which the blowing gas diffuses will increase. In the present invention, the value $(P_2-P_1)$ in the above formula is held small by pre-pressurizing the mold cavity prior to the injection step so that the blowing gas will be more effectively utilized within the mold cavity.

In order to practically ascertain the advantages of the pre-pressurization of mold cavity, some comparative tests were carried out with respect to injection molding operations for pre-pressurized cavities and for cavities under atmosphere.

Figure 3:
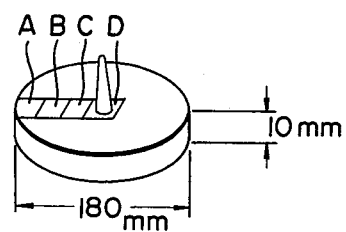
FIG. 3 is a perspective view showing a disc-like foamed article which is injection molded.
Figure 4:
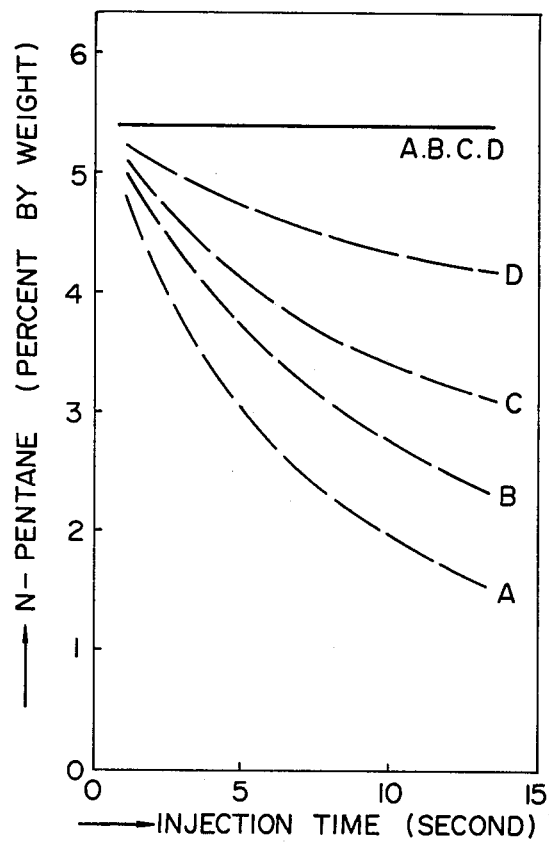
FIG. 4 is a graph illustrating different diffusions of blowing gas in a pre-pressurized mold cavity and a mold cavity which is under atmospheric pressure, in injection molding such an article as shown in FIG. 3.

Referring to FIGS. 3 and 4, disc-like foamed articles having a diameter of 180 millimeter and a thickness of 10 millimeter were produced by injecting plastified polystyrene containing 5.4% by weight of n-pentane as a foaming agent at 200° C. into a correspondingly shaped mold cavity through the central, direct gate thereof. After molded, the foamed articles were measured with respect to the amount of n-pentane within the articles. When the mold cavity was pre-pressurized by sufficient gas pressure to inhibit the expanding of n-pentane in the polystyrene, there was no diffusion of n-pentane independently of injection time. When the mold cavity is under atmosphere, the n-pentane diffused during the injection step and the diffusion increased with the injection time being elongated. It was also found that the amount of n-pentane varied at different locations A, B, C and D in an foamed article.

Figure 5:
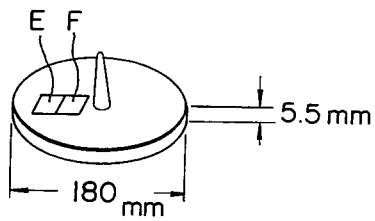
FIG. 5 is a perspective view similar to FIG. 3, showing a disc-like foamed product different from the foamed article of FIG. 3 in thickness.
Figure 6:
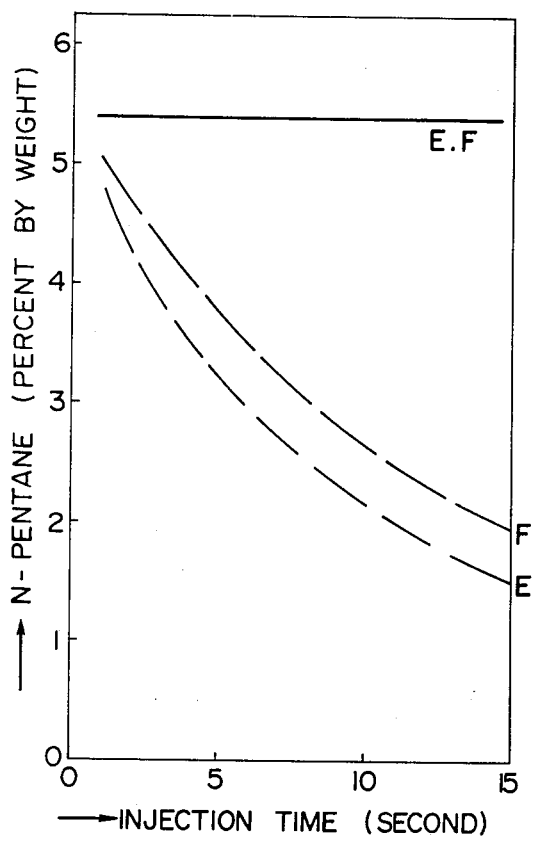
FIG. 6 is a graph showing diffusions of blowing gas in the foamed product of FIG. 5 as measured in a similar way to FIG. 4.

FIGS. 5 and 6 illustrate comparative tests in which disc-like foamed articles having a thickness of 5.5 millimeter and the same diameter as in FIG. 3 were measured with respect to the amount of n-pentane. The result was substantially the same as in FIG. 4.

It is apparent from the above comparative tests that the diffusion of blowing gas can be completely prevented by pre-pressurizing the mold cavity. If the injecting time is elongated over three seconds, particularly five seconds, more advantages in the pre-pressurization will be obtained.

Figure 7:
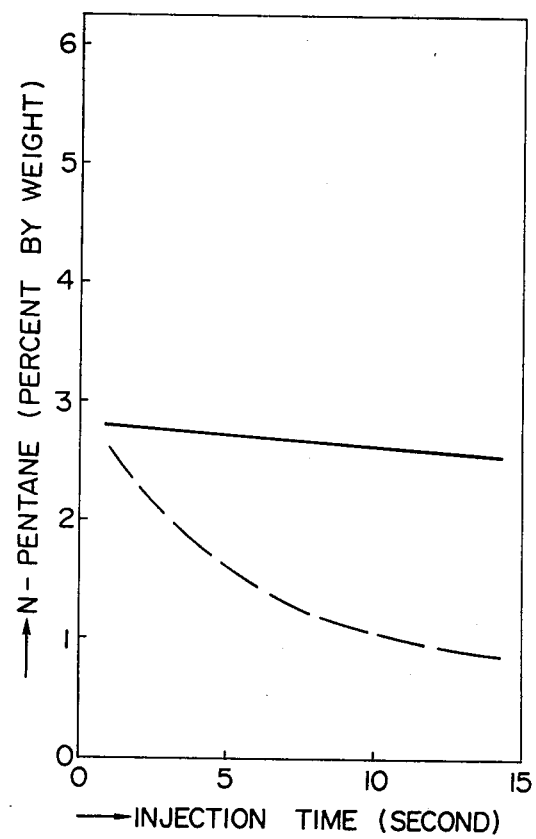
FIG. 7 is a graph showing different diffusions of blowing gas in a pre-pressurized cavity and a cavity under atmospheric pressure, when a foamable synthetic resin is injected into one-half the mold cavity in volume.

Disc-like foamed articles similar to that in FIG. 3 were produced by injecting polystyrene containing 5.4% by weight of n-pentane into one-half the mold cavity in volume and shaping only by the expansion of n-pentane. The gas pressure in the prepressurized mold cavity was released to atmosphere immediately after the injection of polystyrene was finished. The molded articles were measured with respect to the amount of n-pentane therewithin for pre-pressurized and non pre-pressurized cavities in such a way as in FIGS. 4 and 6. The results were shown at mean value in FIG. 7. It is apparent from this figure that, in pre-pressurizing, the amount of n-pentane within the articles decreases along a curved incline with the elapse of the injection time. This means that the n-pentane was more effectively utilized as a foaming agent. On the other hand, when the mold cavity was under atmosphere, the diffusion of n-pentane was increased. The increase of diffusion was remarkable, particularly at the injection time over three seconds. This means that the molded articles are poor in duplicativity since the foaming agent is not effectively utilized.

While n-pentane material is used as a foaming agent in the comparative tests of FIGS. 3 through 7, other chemical foaming agents, for example, azodicarbonamide or the like can be similarly used. The azodicarbonamide produces nitrogen gas when heated. The nitrogen diffuses more rapidly than in n-pentane so that the pre-pressurization will be more effectively utilized. Furthermore, residue which produces from the foaming agents due to heat decomposition, for example, acidic matters such as cyanuric acid for azodicarbonamide, will be confined within the injected synthetic resin by pre-pressurizing the molded cavity so that the mold can be prevented from corrosion.

In accordance with the present invention, the pre-pressurization is combined with relatively long injection time to utilize extremely effectively the foaming agents. Moreover, the mold is cooled at least during the injecting operation to obtain molded articles having excellent surface characteristics. Injection time which can be adopted in the present invention is at least three seconds. Since the mold is cooled during the injection step, too long injection time leads to lowered foaming rate. Therefore, injection time in the range of between 5 seconds and 20 seconds is preferred in the present invention.

The injection time will now be described in more details. When a plastified synthetic resin is injected into a disc-like mold cavity in a mold which is heated up to the same temperature as that of the plastified synthetic resin through the central gate of the mold cavity, a relationship between the injection speed and a force tending to open the mold (necessary clamping force) is theoretically represented by the following formula;

$$F = 6 \cdot K \cdot \alpha \frac{1}{h^3} r^2$$

where
F = necessary clamping force;
K = injection speed;
α = ratio of viscosity to shear rate in the injected synthetic resin, $\eta/|\dot{r}|^{n-1}$;
h = thickness of mold cavity; and
r = radius of the synthetic resin which is being injected into the mold cavity.

Figure 12:
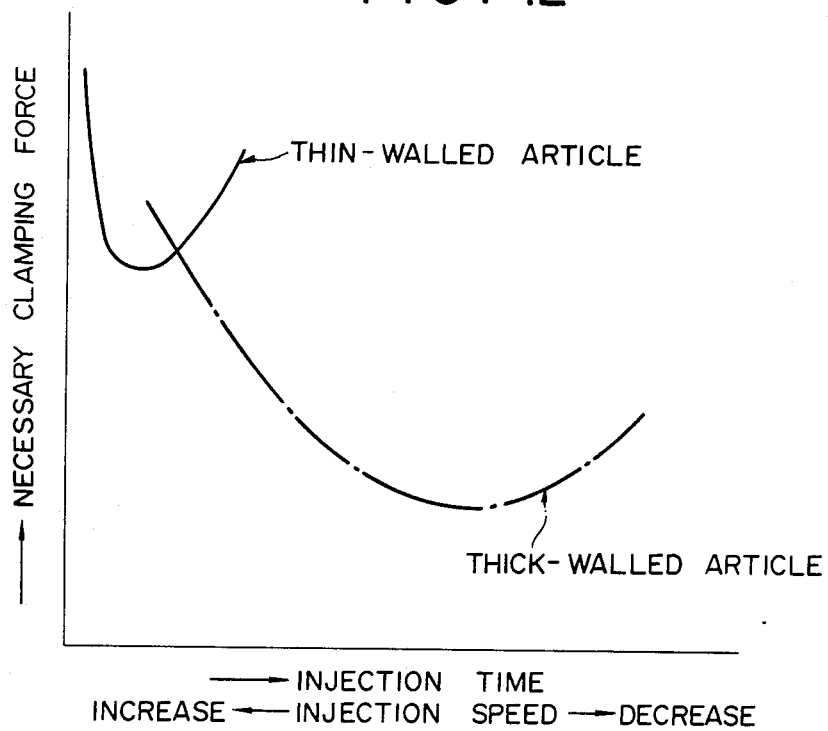
FIG. 12 is a graph showing a relationship between necessary clamping forces and injection times on injection molding thin-walled and thick-walled articles, respectively.

It is apparent from the above formula that smaller necessary clamping force may be required if the injection speed is lower. If the mold is cooled, the injected synthetic resin is immediately solidified on the cooled walls of the mold to form solidified layers therealong. Thus, the synthetic resin which is later injected will advance within a narrower space which is defined by the solidified layers of the synthetic resin. These solidified layers increase in thickness as time goes by. When the thickness h of the mold cavity and thus of an article to be molded is smaller, the solidified layers will remarkably affect the flow of synthetic resin within the mold cavity. Rather, the necessary clamping force can be reduced by increasing the injection speed K to decrease the solidified layers in thickness. In thick-walled articles, however, the solidified layers affect less the flow of synthetic resin within the mold cavity so that there is minimum necessary clamping force at smaller injection speed K as be seen from FIG. 12. Higher injection speed is required to mold thin-walled articles having a thickness of one to two millimeter. On the contrary, the method according to the present invention preferably provides lower injection speed to mold thick-walled articles which are defined in the present invention. However, too late injection speed will lead to increase in thickness of the solidified layers. Consequently, injection time in the present invention is preferred to be in the range of between 5 seconds and 20 seconds as described previously. By adopting such an injection time, injection systems can be simplified in structure so that injection molding machines and associated mold assemblies will be manufactured more inexpensively.

Since any foaming agent can be more effectively utilized in accordance with the present invention, the method thereof uses a synthetic resin material including foaming agent in less amount, for example, in an amount of 0.05% by weight to 5% by weight, preferably 0.5% by weight to 4% by weight. This means that the blowing force in the foaming agent is relatively low and then the necessary clamping force may be smaller. The smaller clamping force may reduce the whole strength in the mold assembly so that it can be manufactured inexpensively with a unit cost in the products being lowered. The clamping force is conveniently represented by a coefficient thereof because it varies at each size of articles to be molded. Such a coefficient of clamping force is a ratio of clamping force by Ton to maximum injection shot volume by Liter. Considering the pre-pressurization in the mold cavity, necessary pressure for pre-pressurizing the mold cavity is determined depending on an amount of foaming agent within the synthetic resin, a viscosity of the resin and the like. In general, pressures above 3 $Kg/cm^2$ are required so that the coefficient must be at or more than 10. Moreover, various experiments indicates that the coefficient of clamping force does not need to exceed 40. Ton above is represented by metric ton.

The amount of synthetic resin to be injected is changed depending on expanding rates of articles to be foamed. In the method of the present invention, the synthetic resin material must be injected into the mold cavity in insufficient amount to fill it. The injected material may be expanded fully within the mold cavity by the expansion of the foaming agent therein. The expanding ratio in the foamed articles molded according to the present invention is larger than that calculated on the basis of shrinkage due to cooling of the injected material.

Any gas which is used to pre-pressurizing the mold cavity is released from the mold cavity immediately before the injection step is completed or immediately after the injection step has been finished. It is best preferred that the gas is released from the mold cavity immediately after the injection step has been completed. In practice, it is impossible to do so. Therefore, the initiation of releasing the gas from the mold cavity is determined in consideration with time required to fully release the gas out of the mold cavity. Consequently, in accordance with the method of the present invention, the releasing of gas is initiated at the soonest before the injection step is fully completed.

It is customary in the prior art that high injection speed is used to obtain excellent foamed articles by injection molding processes. The fact is disclosed, for example, in Journal of Cellular Plastics, January/February, 1978, page 50. In accordance with the present invention, more excellent foamed articles can be obtained by lower injection speed than that in the prior art, and an injection molding system can be more inexpensively manufactured. Further, the prior art has used the pre-pressurization of mold cavity with a foamable synthetic resin being fully charged therein, that is, socalled full-shot techniques. This is completely distinguished from the method according to the present invention.

Figure 11:
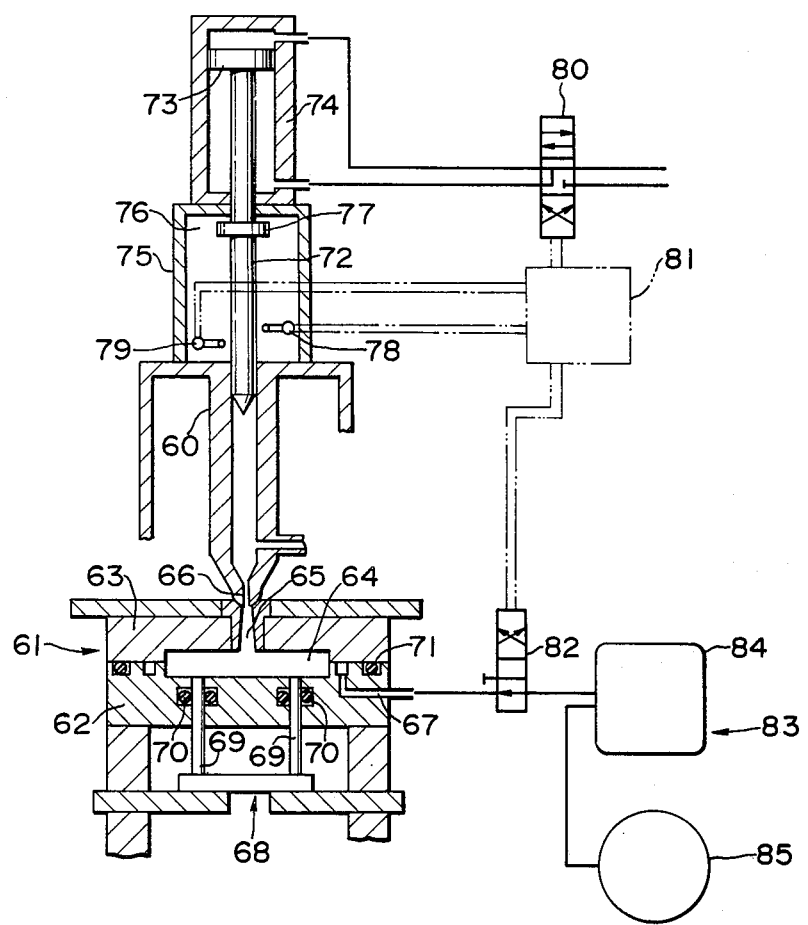
FIG. 11 is a schematic, vertically sectional view showing an injection molding machine provided with means for pre-pressurizing a mold cavity.

FIG. 11 shows a pre-pressurizing mechanism which can be used to carry out the method of the present invention. This mechanism is incorporated into an injection molding machine which comprises an injecting cylinder 60 and a mold assembly 61. The mold assembly 61 includes a fixed mold portion 62 and a movable mold portion 63 which portions define a mold cavity 64 therebetween. The movable mold portion 63 has a sprue 65 adapted to engage the nozzle 66 of the injecting cylinder 60. The stationary mold portion 62 has a passage 67 leading to the mold cavity 64. The stationary mold portion 62 also has a conventional ejecting device 68 having a pair of ejector rods 69 which are mounted on the stationary mold portion 62 therethrough. Sealing O-ring 70 are located around the ejector rods 69 in the stationary mold portion 62. Moreover, another sealing O-rings 71 is located between the stationary and movable mold portions 62 and 63 to seal the mold cavity 64 when the mold portions are closed toward each other.

The injecting cylinder 60 includes a ram 72 received therein which has at its rear end a piston 73 mounted slidably within a hydraulic cylinder 74. The hydraulic cylinder 74 is supplied with hydraulic fluid at either side of the piston 73 to move the ram 72 toward or away from the nozzle end of the injecting cylinder 60. Between the injecting and hydraulic cylinders 60, 74 is located a box-like member 75 defining a chamber 76 which receives an actuating element 77 on the ram 72.

Within the chamber 76 is located switch means including two limit switches 78 and 79. The limit switch 78 serves to actuate valve means for charging the mold cavity 64 with gaseous fluid under pressure as mentioned hereinafter. The other limit switch 79 serves to detect the position of the ram 72 upon the completion of injection or at any suitable point of time before or after the injecting step is finished to prevent further movement of the ram. A signal from the limit switch 79 is transmitted to a change over valve 80 through a control box 81. The change over valve 80 controls flow of the hydraulic fluid to and from the hydraulic cylinder 74 in such a manner as is well known in the art.

The limit switch 78 is adapted to control another change over valve 82 through the control box 81. This change over valve 82 serves to open and close a pipe line connecting between the passage 67 and a source of pressurized gas 83 which comprises an accumulating tank 84 and an air compressor 85.

When the movable mold portion 63 is engaged by the stationary mold portion 62 to define the air-tightly closed cavity 64 and the nozzle 66 of the injecting cylinder 60 is engaged by the sprue portion 65 of the mold portion 63, this is detected by any suitable sensing means (not shown) to actuate the change over valve 82 to connect the passage 67 with the source of pressurized gas 83. Therefore, the gaseous fluid is charged into the mold cavity 64 to pre-pressurize it prior to the injection step. The charging of fluid is detected by any suitable sensing means (not shown) to actuate the valve 80 to feed the hydraulic fluid to the upper side of the piston 73. Therefore, the ram 72 is moved toward the nozzle end of the injection cylinder 60 so that the synthetic resin will be injected into the mold cavity 64 through the sprue 65. Since the limit switch 78 is located in a position representing the position of the ram 72 during or after the injection step, it is engaged by the actuating element 77 of the ram to actuate the valve 82 through the control box 81 so that the passage 67 is vented to the atmosphere to discharge the gaseous fluid from the mold cavity 64.

When the actuating element 77 on the ram 72 engages the limit switch 79, the valve 80 is actuated through the control box 81 to supply the hydraulic fluid to the opposite side of the piston 73 while the hydraulic fluid is discharged from the upper side of the piston 73. Therefore, the ram 72 is moved back upwardly when the synthetic resin material is fed.

The molded article within the mold cavity 64 is cooled during any suitable time interval to be removed therefrom by use of the ejector 68. The above-mentioned procedure will be then repeated.

Figure 13:
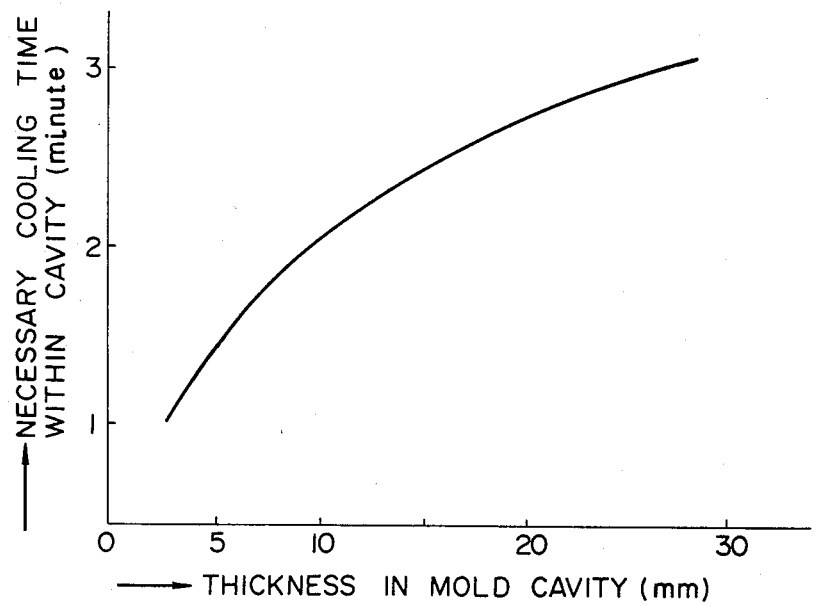
FIG. 13 is a graph showing the relationship between different cavity thicknesses and necessary cooling times within the respective cavity.

FIG. 13 shows the fact that necessary cooling time would be elongated beyond one minute when the thickness of the mold cavity is of more than 3 mm.

In the present invention, a mold assembly may include at least two mold cavities to increase the productivity. The molding material is alternately injected into these mold cavities. As described previously, the method of the present invention provides an injection molding system which can be more inexpensively manufactured. The skilled may think that a plurality of mold cavities will increase the manufacturing cost in the injection molding system. However, if the mold cavities are selectively charged with the molding material so as to hold one of the mold cavities at such a position to be injected as the other mold cavities are cooled, the productivity could be increased with negligible increase in the manufacturing cost of the system.

Figure 8:
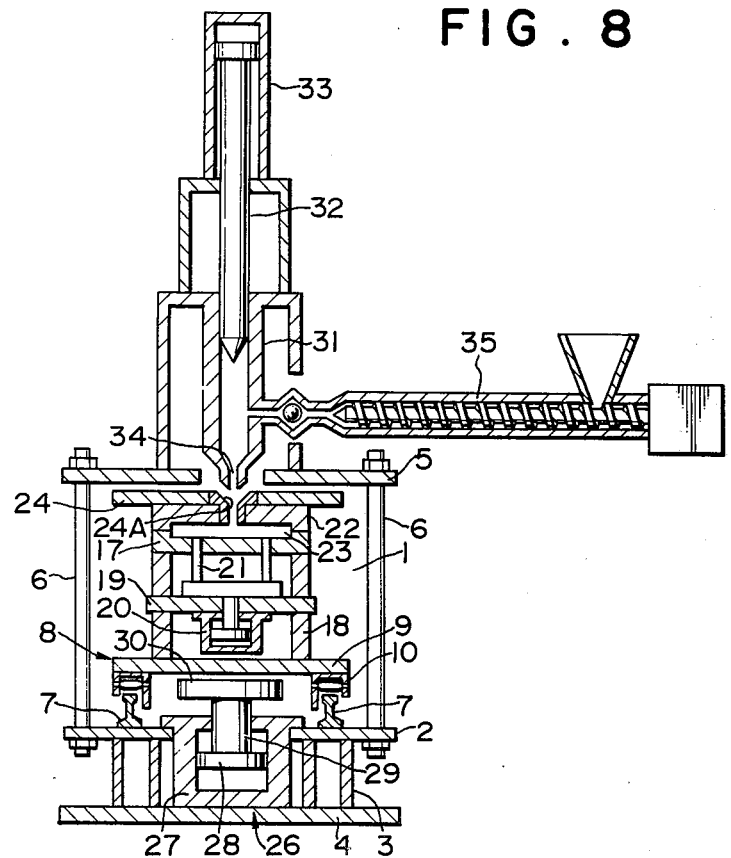
FIG. 8 is a vertical, sectional view showing an injection molding system for carrying out the method of the present invention.
Figure 10:
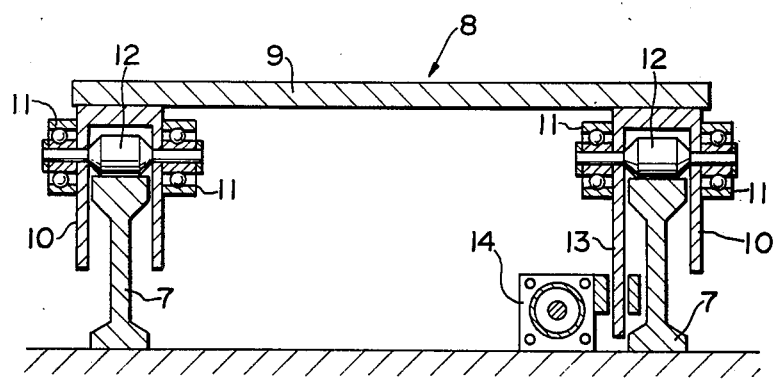
FIG. 10 is a sectional view showing a supporting structure in a mold assembly as shown in FIGS. 8 and 9.

FIGS. 8 through 10 show an injection molding machine which can be used in the present invention. This machine includes an injecting station 1 consisting of a lower plate 2 supported by a base member 3 on a fixed floor 4 and an upper plate 5 connected to the lower plate 2 by tie rods 6 to define a space therebetween.

A pair of rails 7 are disposed across the top face of the lower plate 2 and parallel to each other. The rails 7 support a supporting means 8 which runs reciprocately thereon. The supporting means comprises a pair of elongated brackets 10 and two supporting plates 9 mounted on the brackets 10 thereacross which plates 9 are disposed one after another along the length of the brackets 10. Bearing means 11 is mounted on each of the brackets 10. The respective bearing means 11 includes roller means 12 mounted rotatably thereon which is placed on each of there rails 7. One of the brackets 10 has an extension 13 which extends downwardly from the bracket 10 and is connected at its lower end to a hydraulic cylinder 14. The hydraulic cylinder 14 can reciprocate the supporting means 8 along a horizontal path passing through the injecting station 1.

A mold assembly 16 is mounted on each of the supporting plates 9. The mold assembly 16 comprises a stationary mold portion 17 which is mounted on the supporting plate 9 by means of a fixed member 18. The fixed member 18 includes an intermediate plate 19 which supports a conventional ejector means 20 having ejector rods 21 passing through the stationary mold portion 17.

A movable mold portion 22 is disposed to engage the stationary mold portion 17 so that a mold cavity will be defined therebetween. The movable mold portion 22 is mounted on the lower face of a movable plate 24 which is connected to at least two hydraulic cylinders 25 and has a sprue 24A leading to the mold cavity 23. These hydraulic cylinders 25 move vertically the movable mold portion 22 to open and close the mold cavity 23. The hydraulic cylinders 25 are mounted on the supporting plate 9. The force required to open the mold by the hydraulic cylinders 25 can be reduced corresponding to the clamping force lower than in the prior art. Therefore, in the present invention, it is also possible to use hydraulic cylinders smaller in size and weight than in the prior art.

A clamping device 26 is provided on the central portion of the lower plate 2 in the injecting station 1. The clamping device 26 comprises a hydraulic cylinder 27 mounted in the central opening of the lower plate 2 and a piston 28 mounted slidably within the cylinder 27. The piston 28 has a piston rod 29 which has at its outer end a disc-like clamping member 30. The clamping device 26 can force upwardly the mold assembly 16 positioned in the injecting station into engagement with an injecting cylinder as mentioned hereinafter.

A vertically positioned injecting cylinder 31 is mounted on the upper plate 5 of the injecting station 1, which cylinder 31 receives a ram driven by a hydraulic cylinder 33 to discharge molten synthetic resin containing a foaming agent through the nozzle of the injecting cylinder 31. The material to be injected is fed into the injecting cylinder 31 from a pre-plastifying extruder 35 as is well known in the art and which is connected to the side of the cylinder 31 at right angle thereto.

In such an arrangement, a molten synthetic resin containing a foaming agent is injected from the injecting cylinder 31 through the nozzle thereof into the mold cavity 23 of that mold assembly 16 that is positioned within the injecting station 1. At this time, the mold assembly 16 is urged toward the injecting nozzle 34 of the cylinder 31 by the clamping device 26 with the sprue 24A engaged by the nozzle 34.

In FIG. 9, the charged mold assembly 16 is displaced out of the injecting station 1 and the empty mold assembly 16 is positioned within the injecting station 1. The charged mold assembly 16 positioned outside the injecting station 1 is opened by the hydraulic cylinders 25 after a certain cooling time interval so that the molded article will be removed from the mold cavity 23 of the mold. This operation is repeated for the respective mold assemblies 16.

FIG. 9A shows another injection molding system provided with a plurality of independent mold assemblies. In each of the mold assemblies, supporting means 8 is divided into two sections on each of which the respective mold assembly 16 is mounted independently. The mold assemblies 16 are alternately moved into and positioned at the injecting station 1 to fill the mold cavity thereof with the synthetic resin from the injecting cylinder 31.

Although the injection molding system has been described to have two mold assemblies in connection with FIGS. 8 through 10, more than three mold assemblies can be used in accordance with the present invention.

While various preferred embodiments have been described with respect to the accompanying drawings, many changes or modifications thereof can be accomplished by those skilled in the art without departing the scope and spirit of the invention.

What is claimed is:

1. A method for the production of foamed articles having an average wall thickness of between 3.5 mm and 100 mm by injecting a molten synthetic resin material with a foaming agent contained therein from an injection cylinder means into a cavity of a mold means, said method comprising the steps of:

(a) clamping said mold means by a relatively low clamping force having a coefficient in the range of between 10 and 40, said coefficient being represented as a ratio of clamping force (ton) to maximum injection shot volume (liter);

(b) pre-pressurizing the cavity of said mold means by supplying thereto a gas which has such a pressure at least above 3 kg per square centimeter so that the diffusion of the blowing gas produced from said foaming agent will be substantially prevented;

(c) injecting an amount of molten synthetic resin material that is insufficient to fill the cavity and which contains a foaming agent in an amount about 0.05% by weight to about 5% by weight into said pre-pressurized cavity from the injection cylinder means for a predetermined time in the range of between 3 and 20 seconds;

(d) releasing said pressurized gas from said mold cavity no earlier than immediately before completing said injection step for expanding the injected foamable resin material to fill said mold cavity; and (e) cooling said mold means at least during said injection step.

2. The method as claimed in claim 1 wherein at least two mold means are provided each with its own mold cavity and said molten synthetic resin material is alternately injected into each respective mold cavity.

3. Method as claimed in claim 5, wherein said mold means is actuated to move alternately said mold cavities along a linear path to a position in which said material is injected thereinto from said injection cylinder means.

* * * * *